US012810390B2

(12) United States Patent
Xu et al.

(10) Patent No.: US 12,810,390 B2
(45) Date of Patent: Nov. 24, 2026

(54) ONE-CLICK DATA PROCESSING METHOD FOR DIGITALIZED AERIAL IMAGES

(71) Applicants: STATE GRID HUZHOU POWER SUPPLY COMPANY, Zhejiang (CN); ZHEJIANG TAILUN POWER GROUP CO., LTD., Zhejiang (CN)

(72) Inventors: Jing Xu, Zhejiang (CN); Yutong Ye, Zhejiang (CN); Xinhang Chen, Zhejiang (CN); Xiaobin Shen, Zhejiang (CN); Feiyue Chen, Zhejiang (CN); Zhen Wang, Zhejiang (CN); Yongsheng Xu, Zhejiang (CN); Xinlong Wu, Zhejiang (CN)

(73) Assignees: STATE GRID HUZHOU POWER SUPPLY COMPANY, Zhejiang (CN); ZHEJIANG TAILUN POWER GROUP CO., LTD., Zhejiang (CN)

( * ) Notice: Subject to any disclaimer, the term of this patent is extended or adjusted under 35 U.S.C. 154(b) by 203 days.

(21) Appl. No.: 18/714,790

(22) PCT Filed: Mar. 21, 2023

(86) PCT No.: PCT/CN2023/082784
§ 371 (c)(1),
(2) Date: May 30, 2024

(87) PCT Pub. No.: WO2024/187500
PCT Pub. Date: Sep. 19, 2024

(65) Prior Publication Data

US 2026/0111998 A1 Apr. 23, 2026

(30) Foreign Application Priority Data

Mar. 10, 2023 (CN) ........................ 202310248772.6

(51) Int. Cl.
*G06T 5/50* (2006.01)
*G06T 5/20* (2006.01)
(Continued)

(52) U.S. Cl.
CPC .................. *G06T 5/50* (2013.01); *G06T 5/20* (2013.01); *G06T 5/80* (2024.01); *G06T 7/80* (2017.01);
(Continued)

(58) Field of Classification Search
CPC .... G06T 5/50; G06T 5/20; G06T 5/80; G06T 7/80; G06T 2207/10032; G06T 2207/20212; G06T 2207/30168
(Continued)

(56) References Cited

U.S. PATENT DOCUMENTS

2011/0129154 A1* 6/2011 Shimodaira ............... G06T 7/80 382/190
2012/0114229 A1* 5/2012 Zhou .................... G01C 11/025 382/164
(Continued)

FOREIGN PATENT DOCUMENTS

CN 107527328 A * 12/2017 ............... G06T 7/30
CN 108961150 A 12/2018
(Continued)

OTHER PUBLICATIONS

Zhou Zhancheng et al., "Research on the Technology of Digital Orthophoto Maps Generation from Unmanned Aerophotogrammetric System", Standardization of Surveying and Mapping, Sep. 2011, vol. 27, No. 3, pp. 16-18, ISSN : 1674-3792 (English Abstract is submitted herewith.).

*Primary Examiner* — Jennifer Mehmood
*Assistant Examiner* — Heath E. Wells
(74) *Attorney, Agent, or Firm* — The PL Law Group, PLLC

(57) ABSTRACT

A one-click data processing method for digitalized aerial image includes acquiring all aerial images captured by an unmanned aerial vehicle (UAV) in an aerial-photographed area and performing filtering sequentially on each aerial image, constructing a high-precision calibration test-field, determining a distortion correction parameter of a to-be-
(Continued)

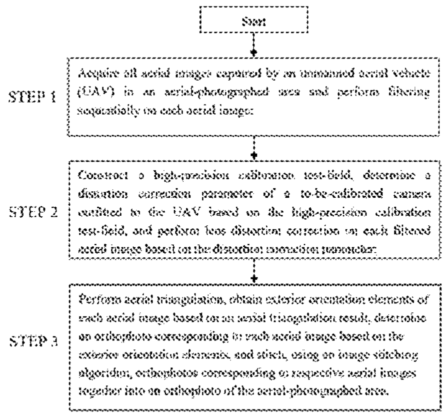

calibrated camera outfitted to the UAV based on the high-precision calibration test-field, and performing lens distortion correction on each filtered aerial image based on the distortion correction parameter, performing aerial triangulation, obtaining exterior orientation elements of each aerial image based on an aerial triangulation result, determining an orthophoto corresponding to each aerial image based on the exterior orientation elements, and stitching, using an image stitching algorithm, orthophotos corresponding to respective aerial images together into an orthophoto of the aerial-photographed area.

6 Claims, 1 Drawing Sheet

(51) Int. Cl.
*G06T 5/80* (2024.01)
*G06T 7/80* (2017.01)

(52) U.S. Cl.
CPC ............... *G06T 2207/10032* (2013.01); *G06T 2207/20212* (2013.01); *G06T 2207/30168* (2013.01)

(58) Field of Classification Search
USPC .......................................................... 382/275
See application file for complete search history.

(56) References Cited

U.S. PATENT DOCUMENTS

| | | | | |
|---|---|---|---|---|
| 2017/0084037 | A1* | 3/2017 | Barajas Hernandez ..................... | G06V 10/462 |
| 2021/0131804 | A1* | 5/2021 | Sasaki .................... | G01C 11/04 |
| 2021/0358206 | A1* | 11/2021 | Song .................... | G01C 21/005 |
| 2022/0292691 | A1 | 9/2022 | Kitamura et al. | |

FOREIGN PATENT DOCUMENTS

| | | | |
|---|---|---|---|
| CN | 110954068 | A | 4/2020 |
| CN | 112113542 | A | 12/2020 |

* cited by examiner

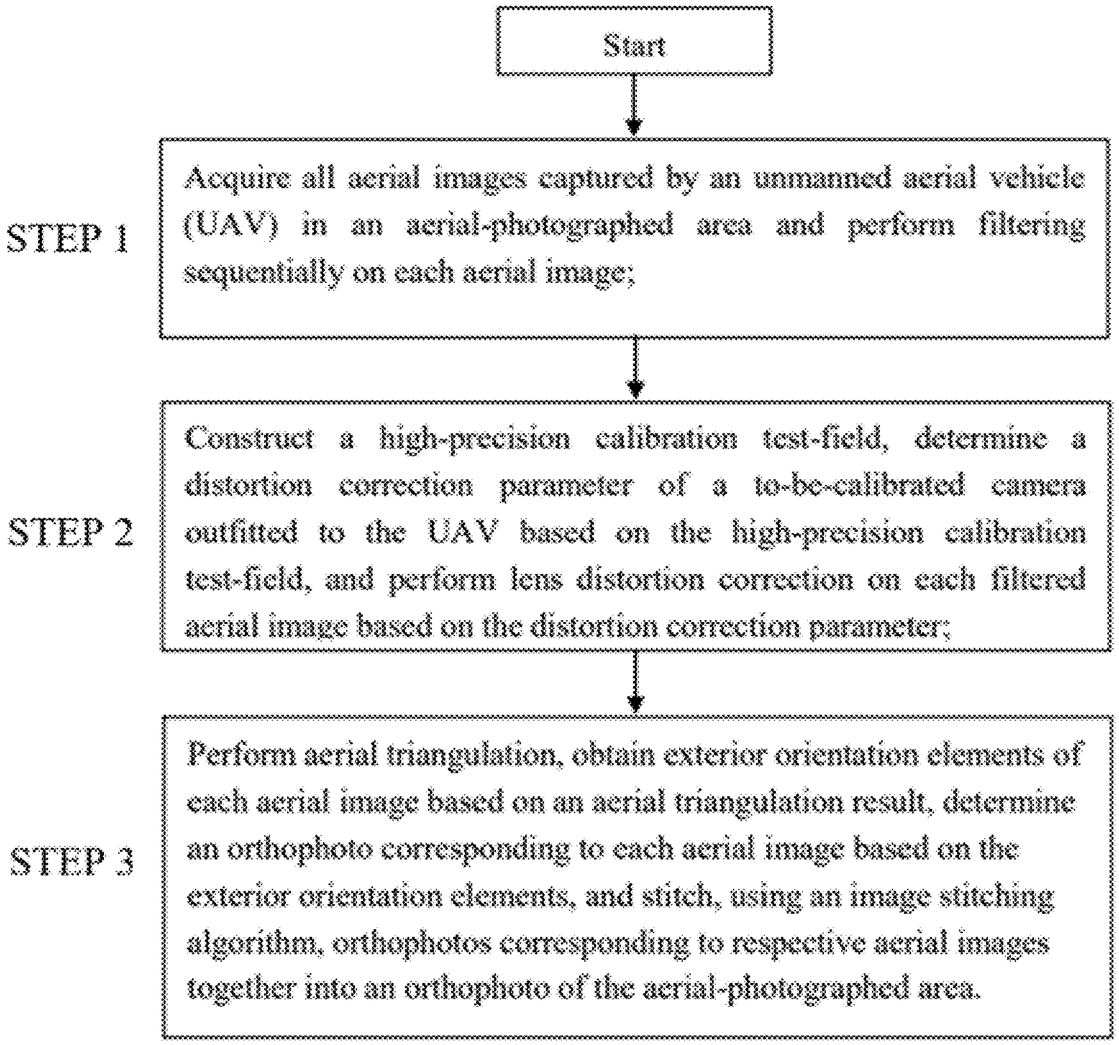
Start
STEP 1
Acquire all aerial images captured by an unmanned aerial vehicle (UAV) in an aerial-photographed area and perform filtering sequentially on each aerial image;
STEP 2
Construct a high-precision calibration test-field, determine a distortion correction parameter of a to-be-calibrated camera outfitted to the UAV based on the high-precision calibration test-field, and perform lens distortion correction on each filtered aerial image based on the distortion correction parameter;
STEP 3
Perform aerial triangulation, obtain exterior orientation elements of each aerial image based on an aerial triangulation result, determine an orthophoto corresponding to each aerial image based on the exterior orientation elements, and stitch, using an image stitching algorithm, orthophotos corresponding to respective aerial images together into an orthophoto of the aerial-photographed area.

ONE-CLICK DATA PROCESSING METHOD FOR DIGITALIZED AERIAL IMAGES

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/CN2023/082784, filed Mar. 21, 2023, which claims priority to the benefit of Chinese Patent Application No. 202310248772.6 filed on Mar. 10, 2023, in the China Intellectual Property Office, the entire contents of which are incorporated herein by reference.

BACKGROUND

1. Technical Field

The subject matter described herein relates to aerial images data processing, and more particularly relates to a one-click data processing method for digitalized aerial images.

2. Background Art

With advancements in unmanned aerial vehicle (UAV) technologies, capabilities of UAV aerial photogrammetric systems in data acquisition and processing have been gradually enhanced, and accuracy of photogrammetric-derived products has been increasingly improved. Now, UAV photogrammetry has become an effective alternative to classical surveying techniques. Compared with classical surveying techniques, the UAV photogrammetry operates more flexibly and efficiently, enabling much of traditional field work to be done indoors, whereby field workloads and operation costs are reduced. The UAV photogrammetry has been well recognized due to its decided advantages in various fields such as basic surveying and mapping, mine surveying, route selection, disaster assessment, crop census, and cadastral surveying.

Over its history of more than one century, aerial photogrammetry techniques have evolved from analog photogrammetry and analytical photogrammetry into digital photogrammetry. The aerial photogrammetry is currently applied extensively in various sectors of national economy, and is also one major tool employed for geospatial data acquisition and update in the fields such as basic surveying and mapping, national land surveying and mapping, mining, transportation, and hydrographic surveying and charting. At present, aerial photography is basically implemented by a manned aerial vehicle outfitted with a specialized aerial surveying camera.

Unlike classical satellite images and aerial images, UAV-based images need data processing to avoid issues caused by flight limitations such as low flight altitude and narrow field of view. However, traditional aerial image data processing methods cannot satisfy processing demands of UAV-based image data, as the images resulting therefrom generally have problems such as small format and numerousness; in addition, some images thereof are of poor quality. Therefore, aerial images can hardly satisfy the demands of aerial photogrammetry.

SUMMARY

To overcome the above and other drawbacks of conventional technologies, the disclosure provides a one-click data processing method for digitalized arial images, which processes UAV-captured aerial images by filtering, lens distortion correction, aerial triangulation, and image stitching, whereby problems of UAV-captured aerial images such as small format, numerousness, and some images thereof being of poor quality can be solved and accuracy of the aerial images can meet requirements of aerial photogrammetry.

The disclosure is implemented via a technical solution provided infra:

A one-click data processing method for digitalized aerial images, including:

Step 1: acquiring all aerial images captured by an unmanned aerial vehicle (UAV) in an aerial-photographed area and performing filtering sequentially on each aerial image;

Step 2: constructing a high-precision calibration test-field, determining a distortion correction parameter of a to-be-calibrated camera outfitted to the UAV based on the high-precision calibration test-field, and performing lens distortion correction on each filtered aerial image based on the distortion correction parameter;

Step 3: performing aerial triangulation, obtaining exterior orientation elements of each aerial image based on an aerial triangulation result, determining an orthophoto corresponding to each aerial image based on the exterior orientation elements, and stitching, using an image stitching algorithm, orthophotos corresponding to respective aerial images together into an orthophoto of the aerial-photographed area.

Furthermore, a process of the constructing a high-precision calibration test-field and determining a distortion correction parameter of a to-be-calibrated camera based on the high-precision calibration test-field in Step 2 includes: constructing a calibration test-field including a plurality of landmarks with known coordinates, capturing images of the calibration test-field using the to-be-calibrated camera, extracting image-point coordinates of each landmark on the captured images of the calibration test-field, subjecting object coordinates of each landmark to perspective transformation calculation according to a collinearity equation to obtain ideal image coordinates, and inputting the ideal image coordinates into an image distortion correction model, whereby the distortion correction parameter is derived.

Furthermore, the image distortion correction model applied for image correction in Step 2 is given below:

$$\left.\begin{aligned}\Delta x &= (x-x_0)(k_1r^2+k_2r^4)+p_1\left[r^2+2(x-x_0)^2\right]+\\&\quad 2p_2(x-x_0)(y-y_0)+\alpha(x-x_0)+\beta(y-y_0)\\\Delta y &= (y-y_0)(k_1r^2+k_2r^4)+p_2\left[r^2+2(y-y_0)^2\right]+\\&\quad 2p_1(x-x_0)(y-y_0)+\alpha(x-x_0)+\beta(y-y_0)\\r &= \sqrt{(x-x_0)^2+(y-y_0)^2}\end{aligned}\right\}$$

where Δx and Δy denote correction values for an image point; (x, y) denotes coordinates of the image point, ($x_0$, $y_0$) denotes principal-point coordinates, r denotes radius vector of the image point, $k_1$ and $k_2$ denote radial distortion coefficients, $p_1$ and $p_2$ denote tangential distortion coefficients, α denotes proportionality factor of non-square pixels, and β denotes non-orthogonal distortion coefficient.

Furthermore, a process of the performing aerial triangulation in Step 3 includes: resolving exterior orientation elements and ground point coordinate values of each aerial image, obtaining image-point coordinates of corresponding control points and undetermined point of each aerial image, determining an error equation based on collinearity condition, calculating corresponding ground coordinates of the undetermined point of each aerial image based on the corresponding image-point coordinates and the error equation, determining a common intersection point of every two neighboring aerial images, and taking the mean value of all common intersection points as an aerial triangulation result.

Furthermore, the stitching, using an image stitching algorithm, orthophotos corresponding to respective aerial images together into an orthophoto of the aerial-photographed area in Step 3 includes: extracting feature points of the orthophotos corresponding to respective aerial images, subjecting the extracted feature points to feature point matching, and stitching the orthophotos together based on a result of the feature point matching.

Furthermore, a process of the extracting feature points of the orthophotos corresponding to respective aerial images includes: selecting one of the aerial images, calculating interest values of respective pixels in the selected aerial image, selecting pixel points whose interest value exceeds a preset threshold as candidate feature points, selecting a maxima point from among the candidate feature points as a feature point of interest.

Furthermore, a process of the calculating interest values of respective pixels in the selected aerial image includes: selecting one of the pixels, delimiting an n*n image window centered about the selected pixel, resolving quadratic sums of gray differences between neighboring pixels in four, principal directions of the delimited image window, and selecting a minimum value from among the quadratic sums of gray differences as the interest value of the selected pixel.

Furthermore, an expression for calculating the interest value of the pixel is given below:

$$\left.\begin{aligned} V_1 &= \sum_{i=-k}^{k-1} (g_{c+i,r} - g_{c+i+1,r})^2 \\ V_2 &= \sum_{i=-k}^{k-1} (g_{c+i,r+i} - g_{c+i+1,r+i+1})^2 \\ V_3 &= \sum_{i=-k}^{k-1} (g_{c,r+i} - g_{c,r+i+1})^2 \\ V_4 &= \sum_{i=-k}^{k-1} (g_{c+i,r-i} - g_{c+i+1,r-i-1})^2 \end{aligned}\right\}$$

$$IV_{c,r} = \min\{V_1, V_2, V_3, V_4\}$$

where $V_1$, $V_2$, $V_3$, and $V_4$ denote the quadratic sums of gray differences in the four principal directions, respectively, k=INT (n/2), c and r denote coordinates of the selected pixel on y-axis and x-axis, respectively, g denotes gray difference between neighboring pixels, k denotes the number of pixels in respective principal direction within the image window, and i denotes the $i^{th}$ pixel in respective principal direction.

Furthermore, the performing filtering on each aerial image includes: determining an aerial image template, moving the aerial image template point-by-point in each aerial image, and multiplying respective element values of the template and pixel values of the aerial image corresponding to the template, where the product serves as a gray value of the pixel where an instant template center is located.

The disclosure has the following beneficial effects:

The UAV-captured aerial images are processed by filtering and lens distortion correction, which guarantees that the aerial photography accuracy and image sharpness can satisfy requirements. The aerial triangulation and image stitching can effectively solve the problems of aerial images such as small format and numerousness; the orthophoto derived from aerial triangulation and image stitching has an elevation measurement accuracy satisfying technical requirements of aerial photogrammetry.

BRIEF DESCRIPTION OF THE DRAWING

FIGURE is a flow diagram of the disclosure.

DETAILED DESCRIPTION

Hereinafter, the disclosure will be described in further detail through example embodiments with reference to the drawings.

Example Embodiment

A one-click data processing method for digitalized aerial images, as illustrated in FIGURE, includes:

- Step 1: acquiring all aerial images captured by an unmanned aerial vehicle (UAV) in an aerial-photographed area and performing filtering sequentially on each aerial image;
- Step 2: constructing a high-precision calibration test-field, determining a distortion correction parameter of a to-be-calibrated camera outfitted to the UAV based on the high-precision calibration test-field, and performing lens distortion correction on each filtered aerial image based on the distortion correction parameter;
- Step 3: performing aerial triangulation, obtaining exterior orientation elements of each aerial image based on an aerial triangulation result, determining an orthophoto corresponding to each aerial image based on the exterior orientation elements, and stitching, using an image stitching algorithm, orthophotos corresponding to respective aerial images together into an orthophoto of the aerial-photographed area.

During the process of capturing aerial photogrammetric images of an area, a UAV photogrammetric system is likely affected by various factors such as topographic relief and non-uniform illumination, and noises are likely present in the raw images captured. In addition, in a case that a non-metric camera is outfitted to the UAV, lens distortion correction is also required. Therefore, the aerial images will be pre-processed first so as to prevent cumulative impacts of image noises and lens distortion, thereby guaranteeing quality of subsequent processing.

A process of removing noises in digital images is referred to as filtering. Factors such as ambient condition of image acquisition and quality of sensing elements will all cause an impact on operation of an image sensor. For example, an image captured by a CCD camera likely has extensive noises due to impacts of luminous intensity and sensor temperature. Noises occur randomly to a digital image. Main noises include Gaussian noise, salt and pepper noise, Poisson noise, and Rayleigh noise, which are removed by a filtering process.

In this example embodiment, an example process of filtering includes: determining an aerial image template, moving the aerial image template point-by-point in each aerial image, and multiplying respective element values of the template and pixel values of the aerial image corresponding to the template, where the product serves as a gray value of the pixel where an instant template center is located.

It is noted that spatial filtering includes a smoothing operation and a sharpening operation. The smoothing operation mainly serves to reduce noise, preserve edges, and blur out small-sized objects. In mathematical morphology, the smoothing operation may be further classified into linear filtering and non-linear filtering. The linear filtering has a disadvantage of causing blurring of the image edge; therefore, non-linear filtering is usually used. The non-linear filtering mainly serves to remove those spots brighter or darker than their neighboring pixels, which is effective in processing salt and pepper noise. The sharpening operation mainly serves to enhance image details, which may be divided into a first order derivative class and a second order derivative class. Typical operators of the first order derivative-based sharpening filter include Roberts operator and Sobel operator, and typical operators of the second order derivative-based sharpening filter include Laplacian operator.

In addition, since UAVs have a relatively low payload capacity, the aerial photogrammetric device outfitted thereto is mostly a non-metric camera, the lens of which suffers different degrees of distortion. Lens distortion is in fact a collective term for perspective distortions inherent in optical lenses, which may cause offset of an actual image-point position of an image from its theoretical value, disrupting the collinear relationship between object points, projection center, and corresponding image points, i.e., homogeneous rays are not intersected, causing displacement of image-point coordinates, deteriorating accuracy of space resection, and finally affecting the accuracy of aerial triangulation; as a result, the produced digital orthophoto is also distorted. Lens distortion is classified into radial distortion, decentering distortion, and tangential distortion.

Radial distortion refers to radial displacement of the principal point due to radial curvature error of the lens, and the distortion increases from the center to the outside. The decentering distortion and the tangential distortion are originated from assembly error, caused by non-collinearity of the axes of remote sensing optical elements and misalignment of CCD matrices, respectively. The three types of distortion jointly cause distortion of a remote sensing digital image.

To address image distortion issues, this example embodiment implements lens distortion correction by constructing a high-precision calibration test-field and determining a distortion correction parameter of a to-be-calibrated camera based on the high-precision calibration test-field.

An example process of the constructing a high-precision calibration test-field and determining a distortion correction parameter of a to-be-calibrated camera based on the high-precision calibration test-field includes: constructing a calibration test-field including a plurality of landmarks with known coordinates, capturing images of the calibration test-field using the to-be-calibrated camera, extracting image-point coordinates of each landmark on the captured images of the calibration test-field, subjecting object coordinates of each landmark to perspective transformation calculation according to a collinearity equation to obtain ideal image coordinates, and inputting the ideal image coordinates into an image distortion correction model, whereby the distortion correction parameter is derived.

The calibration test-field may be generally divided into a 2D calibration test-field and a 3D calibration test-field. The calibration test-field is highly demanding on accuracy of control points, usually at a submillimeter level. Relevant devices such as the targets and bars of the test field are also made of special alloy materials with a very small expansion coefficient.

The image distortion correction model applied for image correction in Step 2 is given below:

$$\left.\begin{aligned} \Delta x &= (x-x_0)\left(k_1 r^2 + k_2 r^4\right) + p_1\left[r^2 + 2(x-x_0)^2\right] + \\ &\quad 2p_2(x-x_0)(y-y_0) + \alpha(x-x_0) + \beta(y-y_0) \\ \Delta y &= (y-y_0)\left(k_1 r^2 + k_2 r^4\right) + p_2\left[r^2 + 2(y-y_0)^2\right] + \\ &\quad 2p_1(x-x_0)(y-y_0) + \alpha(x-x_0) + \beta(y-y_0) \\ r &= \sqrt{(x-x_0)^2 + (y-y_0)^2} \end{aligned}\right\}$$

where Δx and Δy denote correction values for an image point; (x, y) denotes coordinates of the image point, $(x_0, y_0)$ denotes principal-point coordinates, r denotes radius vector of the image point, $k_1$ and $k_2$ denote radial distortion coefficients, $p_1$ and $p_2$ denote tangential distortion coefficients, α denotes proportionality factor of non-square pixels, and β denotes non-orthogonal distortion coefficient.

Aerial triangulation mainly serves to fast resolve the orientation elements and ground point coordinates of an image with a few ground control points. The main principle is to measure orientational elements of the image indoors based on the geological relationship between the captured image and the photographed object in addition to certain quantities of field control point data and measurement data on the image; its basic process of aerial triangulation includes constructing a strip model or a regional model corresponding to the real-world site using images continuously captured with certain overlap, thereby obtaining the planimetric coordinates and elevation of a undetermined point.

In this example embodiment, an example process of performing aerial triangulation includes: resolving exterior orientation elements and ground point coordinate values of each aerial image, obtaining corresponding image-point coordinates of control points and undetermined point of each aerial image, determining an error equation based on collinearity condition, calculating ground coordinates of the corresponding undetermined point of each aerial image based on the corresponding image-point coordinates and the error equation, determining a common intersection point of every two neighboring aerial images, and taking the mean value of all common intersection points as an aerial triangulation result.

The stitching, using an image stitching algorithm, orthophotos corresponding to respective aerial images together into an orthophoto of the aerial-photographed area in Step 3 includes: extracting feature points of the orthophotos corresponding to respective aerial images, subjecting the extracted feature points to feature point matching, and stitching the orthophotos together based on a result of the feature point matching.

An example process of the extracting feature points of the orthophotos corresponding to respective aerial images includes: selecting one of the aerial images, calculating interest values of respective pixels in the selected aerial image, selecting pixel points whose interest value exceeds a preset threshold as candidate feature points, selecting a maxima point from among the candidate feature points as a feature point of interest.

An example process of the calculating interest values of respective pixels in the selected aerial image includes: selecting one of the pixels, delimiting an n*n image window centered about the selected pixel, resolving quadratic sums of gray differences between neighboring pixels in four principal directions of the delimited image window, and selecting a minimum value from among the quadratic sums of gray differences as the interest value of the selected pixel.

An expression for calculating the interest value of the pixel is given below:

$$\left.\begin{aligned} V_1 &= \sum_{i=-k}^{k-1}(g_{c+i,r}-g_{c+i+1,r})^2 \\ V_2 &= \sum_{i=-k}^{k-1}(g_{c+i,r+i}-g_{c+i+1,r+i+1})^2 \\ V_3 &= \sum_{i=-k}^{k-1}(g_{c,r+i}-g_{c,r+i+1})^2 \\ V_4 &= \sum_{i=-k}^{k-1}(g_{c+i,r-i}-g_{c+i+1,r-i-1})^2 \end{aligned}\right\}$$

$$IV_{c,r}=\min\{V_1, V_2, V_3, V_4\}$$

where $V_1$, $V_2$, $V_3$, and $V_4$ denote the quadratic sums of gray differences in the four principal directions, respectively, k=INT (n/2), c and r denote coordinates of the selected pixel on y-axis and x-axis, respectively, g denotes gray difference between neighboring pixels, k denotes the number of pixels in respective principal direction within the image window, and i denotes the $i^{th}$ pixel in respective principal direction.

What has been described above is only an example embodiment of the disclosure, which is not intended for limiting the disclosure in any manner, and other variables and modifications are possible without departing from the technical solutions limited in the appended claims.

What is claimed is:

1. A one-click data processing method for digitalized aerial images, comprising:

Step 1: acquiring all aerial images captured by an unmanned aerial vehicle (UAV) in an aerial-photographed area and performing filtering sequentially on each aerial image;

Step 2: constructing a high-precision calibration test-field, determining a distortion correction parameter of a to-be-calibrated camera outfitted to the UAV based on the high-precision calibration test-field, and performing lens distortion correction on each filtered aerial image based on the distortion correction parameter;

Step 3: performing aerial triangulation, obtaining exterior orientation elements of each aerial image based on an aerial triangulation result, determining an orthophoto corresponding to each aerial image based on the exterior orientation elements, and stitching, using an image stitching algorithm, orthophotos corresponding to respective aerial images together into an orthophoto of the aerial-photographed area, wherein the stitching the orthophotos corresponding to respective aerial images together into the orthophoto of the aerial-photographed area comprises: extracting feature points of the orthophotos corresponding to respective aerial images, subjecting the extracted feature points to feature point matching, and stitching the orthophotos together based on a result of the feature point matching;

wherein the extracting feature points of the orthophotos corresponding to respective aerial images comprises: selecting one of the aerial images, calculating interest values of respective pixels in the selected aerial image, selecting pixel points whose interest value exceeds a preset threshold as candidate feature points, and selecting a maxima point from among the candidate feature points as a feature point of interest; and wherein the calculating interest values of respective pixels in the selected aerial image comprises: selecting one of the pixels, delimiting an n*n image window centered about the selected pixel, resolving quadratic sums of gray differences between neighboring pixels in four principal directions of the delimited image window, and selecting a minimum value from among the quadratic sums of gray differences as the interest value of the selected pixel.

2. The one-click data processing method for digitalized aerial images of claim 1, wherein a process of the constructing a high-precision calibration test-field and determining a distortion correction parameter of a to-be-calibrated camera based on the high-precision calibration test-field in Step 2 comprises: constructing a calibration test-field including a plurality of landmarks with known coordinates, capturing images of the calibration test-field using the to-be-calibrated camera, extracting image-point coordinates of each landmark on the captured images of the calibration test-field, subjecting object coordinates of each landmark to perspective transformation calculation according to a collinearity equation to obtain ideal image coordinates, and inputting the ideal image coordinates into an image distortion correction model, whereby the distortion correction parameter is derived.

3. The one-click data processing method for digitalized aerial images of claim 2, wherein the image distortion correction model applied for image correction in Step 2 is given below:

$$\left.\begin{aligned} \Delta x &= (x-x_0)(k_1r^2+k_2r^4)+p_1[r^2+2(x-x_0)^2]+ \\ &\quad 2p_2(x-x_0)(y-y_0)+\alpha(x-x_0)+\beta(y-y_0) \\ \Delta y &= (y-y_0)(k_1r^2+k_2r^4)+p_2[r^2+2(y-y_0)^2]+ \\ &\quad 2p_1(x-x_0)(y-y_0)+\alpha(x-x_0)+\beta(y-y_0) \\ r &= \sqrt{(x-x_0)^2+(y-y_0)^2} \end{aligned}\right\}$$

where Δx and Δy denote correction values for an image point; (x, y) denotes coordinates of the image point, $(x_0, y_0)$ denotes principal-point coordinates, r denotes radius vector of the image point, $k_1$ and $k_2$ denote radial distortion coefficients, $p_1$ and $p_2$ denote tangential distortion coefficients, α denotes proportionality factor of non-square pixels, and β denotes non-orthogonal distortion coefficient.

4. The one-click data processing method for digitalized aerial images of claim 1, wherein a process of the performing aerial triangulation in Step 3 comprises: resolving exterior orientation elements and ground point coordinate values of each aerial image, obtaining image-point coordinates of corresponding control points and undetermined point of each aerial image, determining an error equation based on collinearity condition, calculating corresponding ground coordinates of the undetermined point of each aerial image based on the corresponding image-point coordinates and the error equation, determining a common intersection point of every two neighboring aerial images, and taking the mean value of all common intersection points as an aerial triangulation result.

5. The one-click data processing method for digitalized aerial images of claim 1, wherein an expression for calculating the interest value of the pixel is given below:

$$\left.\begin{aligned} V_1 &= \sum_{i=-k}^{k-1} (g_{c+i,r} - g_{c+i+1,r})^2 \\ V_2 &= \sum_{i=-k}^{k-1} (g_{c+i,r+i} - g_{c+i+1,r+i+1})^2 \\ V_3 &= \sum_{i=-k}^{k-1} (g_{c,r+i} - g_{c,r+i+1})^2 \\ V_4 &= \sum_{i=-k}^{k-1} (g_{c+i,r-i} - g_{c+i+1,r-i-1})^2 \end{aligned}\right\}$$

$$IV_{c,r} = \min\{V_1, V_2, V_3, V_4\}$$

where $V_1$, $V_2$, $V_3$, and $V_4$ denote the quadratic sums of gray differences in the four principal directions, respectively, k=INT (n/2), c and r denote coordinates of the selected pixel on y-axis and x-axis, respectively, g denotes gray difference between neighboring pixels, k denotes the number of pixels in respective principal direction within the image window, and i denotes the $i^{th}$ pixel in respective principal direction.

6. The one-click data processing method for digitalized aerial images of claim 1, wherein the performing filtering on each aerial image comprises: determining an aerial image template, moving the aerial image template point-by-point in each aerial image, and multiplying respective element values of the template and pixel values of the aerial image corresponding to the template, where the product serves as a gray value of the pixel where an instant template center is located.

* * * * *